US010681104B1

(12) United States Patent
Wu et al.

(10) Patent No.: US 10,681,104 B1
(45) Date of Patent: Jun. 9, 2020

(54) HANDLING MEDIA TIMELINE OFFSETS (71) Applicant: Amazon Technologies, Inc., Seattle, WA (US)

(72) Inventors: Yongjun Wu, Bellevue, WA (US); Henry Liu, Seattle, WA (US); Amritaansh Verma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 15/799,143

(22) Filed: Oct. 31, 2017

Related U.S. Application Data (60) Provisional application No. 62/558,252, filed on Sep. 13, 2017.

(51) Int. Cl.
*H04L 29/06* (2006.01)
*H04L 29/08* (2006.01)

(52) U.S. Cl.
CPC ........ *H04L 65/604* (2013.01); *H04L 65/4069* (2013.01); *H04L 67/02* (2013.01)

(58) Field of Classification Search
CPC .... H04L 65/604; H04L 65/4069; H04L 67/02
See application file for complete search history.

(56) References Cited

U.S. PATENT DOCUMENTS

| | | | |
|---|---|---|---|
| 6,330,286 B1 | 12/2001 | Lyons et al. | |
| 9,426,543 B1 | 8/2016 | Li et al. | |
| 2007/0244702 A1* | 10/2007 | Kahn | G10L 15/22 704/260 |
| 2008/0267222 A1 | 10/2008 | Leung et al. | |
| 2009/0310729 A1* | 12/2009 | Liu | G06F 5/06 375/376 |
| 2011/0069230 A1* | 3/2011 | Polumbus | G11B 27/10 348/468 |
| 2011/0096828 A1 | 4/2011 | Chen et al. | |
| 2014/0245346 A1 | 8/2014 | Cheng et al. | |
| 2015/0071606 A1 | 3/2015 | Wintzell et al. | |
| 2016/0316233 A1* | 10/2016 | Ghadi | H04N 21/26258 |
| 2018/0081618 A1 | 3/2018 | McLean | |
| 2018/0213294 A1* | 7/2018 | Lau | H04N 21/6125 |
| 2018/0234722 A1* | 8/2018 | Hashimoto | H04N 21/431 |
| 2019/0068665 A1* | 2/2019 | Kieft | H04L 65/4069 |
| 2019/0208274 A1 | 7/2019 | Grouf et al. | |

OTHER PUBLICATIONS

U.S. Appl. No. 16/041,446, filed Jul. 20, 2018, Pringle et al.
PCT International Search Report and Written Opinion, dated Dec. 14, 2018, issued in PCT/US2018/049686.
U.S. Office Action dated Sep. 26, 2019 issued in U.S. Appl. No. 16/041,446.

* cited by examiner

*Primary Examiner* — Michael A Keller
(74) *Attorney, Agent, or Firm* — Weaver Austin Villeneuve & Sampson LLP (57) ABSTRACT

Techniques are described for handling offsets (gaps or overlaps) that occur between segments of streaming content, e.g., between a segment of primary content (e.g., a live sporting event) and a segment of secondary content (e.g., ad content) dynamically inserted into the stream. The effect of such offsets can be that synchronization between the video and audio portions of the stream can be lost. By tracking a cumulative offset derived from the audio portion of the stream and applying that offset to the presentation times of each affected sample of both the audio and video portions of the stream, synchronization of the audio and video is maintained.

22 Claims, 5 Drawing Sheets

HANDLING MEDIA TIMELINE OFFSETS

BACKGROUND

Many client devices that consume online content employ an adaptive bitrate streaming protocol based on an open standard known as Dynamic Adaptive Streaming over HTTP (DASH) to request successive fragments of the content for decoding, rendering, and display. Dynamic DASH refers to the consumption of live streaming content. Dynamic manifest data are provided to the client in the form of one or more XML files that provide the client with the information it needs to generate properly formatted requests for the audio, video, and subtitle fragments of the content. The manifest data typically includes multiple options for video and audio streams, each including video and audio fragment at different resolutions, quality levels, bitrates, languages, etc.

Live streaming content includes primary content that is generated in real time (e.g., live sporting events, live concerts, etc.) and often includes segments of secondary content (e.g., advertisements) that is dynamically inserted on top of the primary content. The secondary content is typically inserted in the place of so-called slates that are inserted (often manually and in real time) as placeholders in the primary content. For example, a slate might be inserted at the source of the live content (e.g., at a football stadium video capture booth) by an operator pushing a button when the slate should begin and releasing or pressing the button again when the slate should end based on what is happening in real time at the event being broadcast (e.g., during a timeout on the field). Given the arbitrary nature of slate insertion, and that secondary content (e.g., ads) inserted in such slate periods originates from other sources (e.g., an ad exchange), it is typically the case that the inserted secondary content is not of the same duration as the slate it replaces. This may be understood with reference to FIG. 1.

Figure 1A:
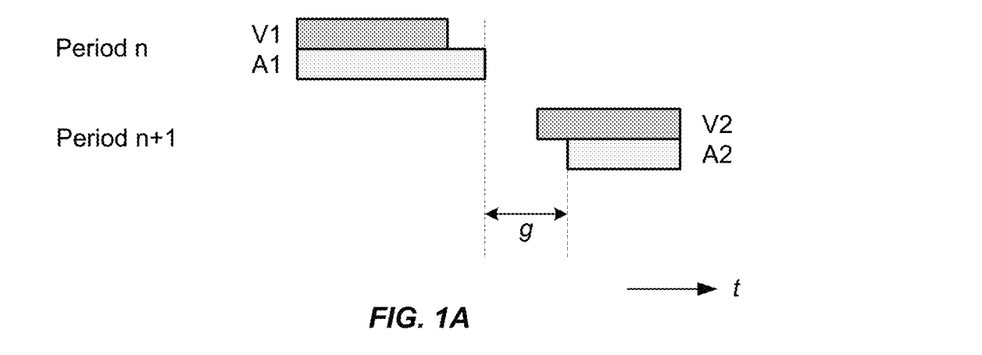
FIG. 1A illustrates an example of a gap between successive segments of live streaming content.

The diagram in FIG. 1A illustrates the situation in which insertion of the secondary content (represented by video fragment V1 and audio fragment A1 of content period n) results in a gap between the end of the secondary content and the beginning of the next segment of primary content (represented by video fragment V2 and audio fragment A2 of period n+1). This gap is represented in the dynamic manifest data which includes metadata for each fragment that specifies its presentation time relative to a media timeline associated with the overall media presentation. That is, for example, the presentation time of V2 in the manifest data is determined by the duration of the preceding slate into which the secondary content was inserted. However, because the inserted secondary content is shorter in duration, there is a corresponding gap between the end of V1 and the beginning of V2, as well as between the end of A1 and the beginning of A2. Further, note that because of differences between audio and video encoding techniques, corresponding fragments of content are not identical in length as illustrated by the different ending and starting points of corresponding fragments V1 and A1, and V2 and A2, respectively. Media players employing the Dynamic DASH protocol are expected to handle such offsets.

The video renderer of a media player relies on the presentation times in the manifest metadata, while the audio renderer does not. Therefore, when a media player encounters such a gap, the frames of the succeeding video fragment, e.g., V2, will not be displayed until their corresponding presentation times in the media timeline. This might show up on the display as a "freezing" of the video on the last frame of the preceding fragment, e.g., V1, or presentation of a blank screen until the presentation time of V2 arrives. By contrast, audio renderers typically employ a "free fall" model that does not pay attention to the presentation times associated with audio samples, simply decoding and playing them back in sequence as they become available according to the audio encoding scheme's sample rate, bit rate, etc. The time stamps for video frames are used by the video renderer and are matched against the audio renderer's playhead to determine when to render, hold or drop a video frame. But because rendering and playback of the samples of fragment A2 begins immediately following the last sample of fragment A1, this effectively shifts audio fragment A2 earlier in the media timeline, i.e., to the left in FIG. 1A by an amount represented by the duration of gap g; causing the audio to lead the video.

Figure 1B:
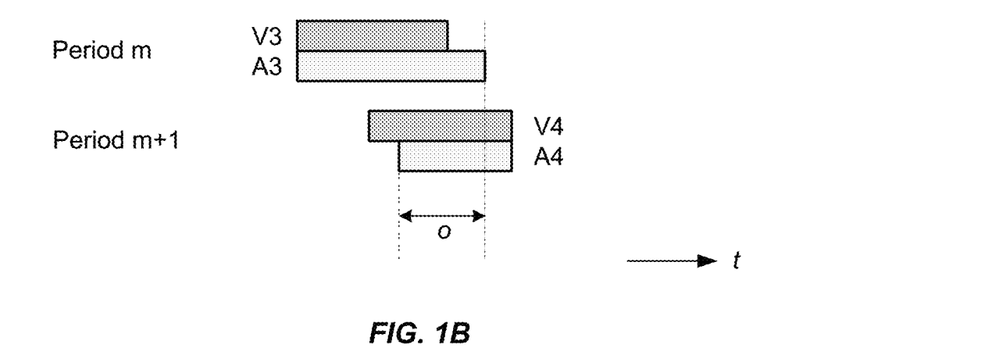
FIG. 1B illustrates an example of an overlap of successive segments of live streaming content.

The diagram in FIG. 1B illustrates the situation in which insertion of the secondary content (represented by video fragment V3 and audio fragment A3 of period m) results in an overlap of the end of the secondary content and the beginning of the next segment of primary content (represented by video fragment V4 and audio fragment A4 of period m+1). In this example, because of the "free fall" model employed by the audio renderer, audio fragment A4 is effectively shifted to the right relative to video fragment V4 by the duration of overlap o, causing the audio to lag the video.

As will be appreciated with reference to these examples, if the media player is not equipped to handle these gaps or overlaps at the transitions between primary and secondary content, the synchronization between audio and video can be lost; potentially with the effect being amplified over time as the effects of such gaps and overlaps accumulate.

One approach to handling this is to simply flush the renderer stack each time a boundary between primary and secondary content is encountered. However this is not the optimal solution because it can increase the chance of re-buffers as the renderer stacks are replenished. It also causes the media player to drift away from the live playhead of the primary content because of the additional time it takes to fill the renderer buffer after a flush. If the playback of the media player, i.e., the client playhead, lags too far behind the live playhead, this can result in a negative viewer experience. Another approach avoids the need to handle such discontinuities by using two media players; one to handle playback of the primary content, and one to handle playback of the secondary content, and switching between the two players. However, running two media players can be wasteful of processing resources and may be characterized by unacceptable latencies when switching between the two players.

DETAILED DESCRIPTION

This disclosure describes techniques for handling offsets (gaps or overlaps) that occur between segments of streaming content, e.g., between a segment of primary content (e.g., a live sporting event) and a segment of secondary content (e.g., ad content) dynamically inserted into the stream. The effect of such offsets can be that synchronization between the video and audio portions of the stream can be lost. By tracking a cumulative offset derived from the audio portion of the stream and applying that offset to the presentation times of each affected sample (also referred to herein as a frame) of both the audio and video portions of the stream, synchronization of the audio and video is maintained. The cumulative offset is derived and updated by logic on the client device based on the presentation times of the audio fragments of the stream as represented in the dynamic manifest data. This offset is then applied to the presentation times (also referred to herein as time stamps) associated with each subsequent sample of the audio and video fragments of the stream. Where subtitles are included with the content, the offset will also be applied to the samples of the subtitle fragments associated with the stream to maintain synchronization of the subtitle content with the audio and video. As will be discussed, the techniques enabled by the present disclosure serve to maintain synchronization of the audio and video portions of a media presentation without requiring the flushing of content from the renderer buffers. An example will be instructive.

Figure 1C:
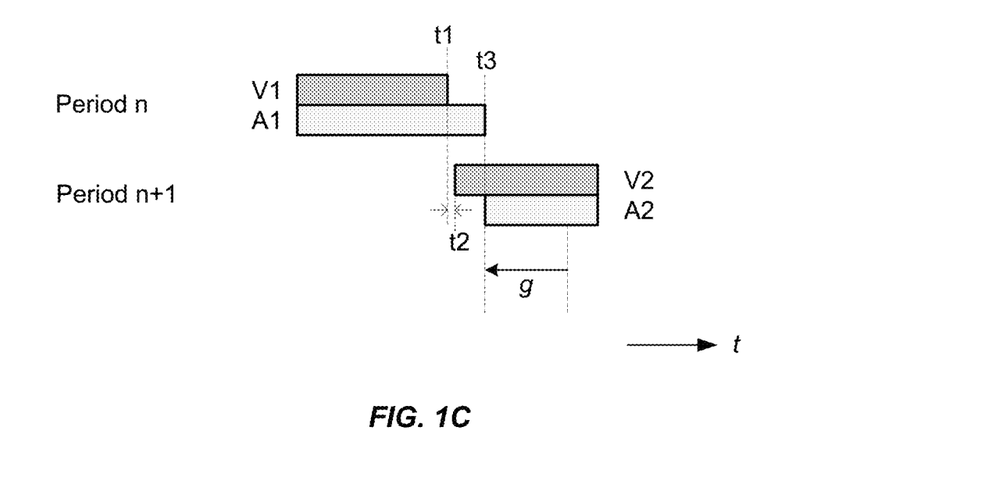
FIG. 1C illustrates an example of handling a gap between segments of live streaming content.

Referring again to the example depicted in FIG. 1A, a gap of duration g is detected from the dynamic manifest data based on the end time of audio fragment A1 and the start time of audio fragment A2. As a result, the presentation times of the samples in audio fragment A2 and video fragment V2 (and all subsequent samples) are reduced by g, effectively moving both to the left on the overall media presentation timeline as shown in FIG. 1C. As the audio renderer processes the samples of audio fragment A1, the video renderer maintains synchronization by comparing the times stamps of its video frames with the time stamps of the audio samples until time t1 at which point video fragment V1 ends. However, because the time stamps of the video frames of video fragment V2 have been reduced by the detected gap duration g, the processing of the frames of fragment V2 can begin at time t2 with only a very small gap between t1 and t2 during which no video frames are available (e.g., the last frame in fragment V1 remains on the screen). At time t3, the processing of the audio samples of fragment A1 ends and the processing of the audio samples of fragment A2 begins, with the processing of the video frames of fragment V2 now being based on the time stamps of the audio samples of fragment A2 rather than A1. And as gaps and overlaps are encountered, corresponding durations of time are either subtracted from or added to the cumulative offset by which the time stamps of subsequent audio and video samples are adjusted. As will be appreciated from this example, synchronization between the audio and video of the media presentation is maintained without the need for flushing the renderer stacks.

Figure 2:
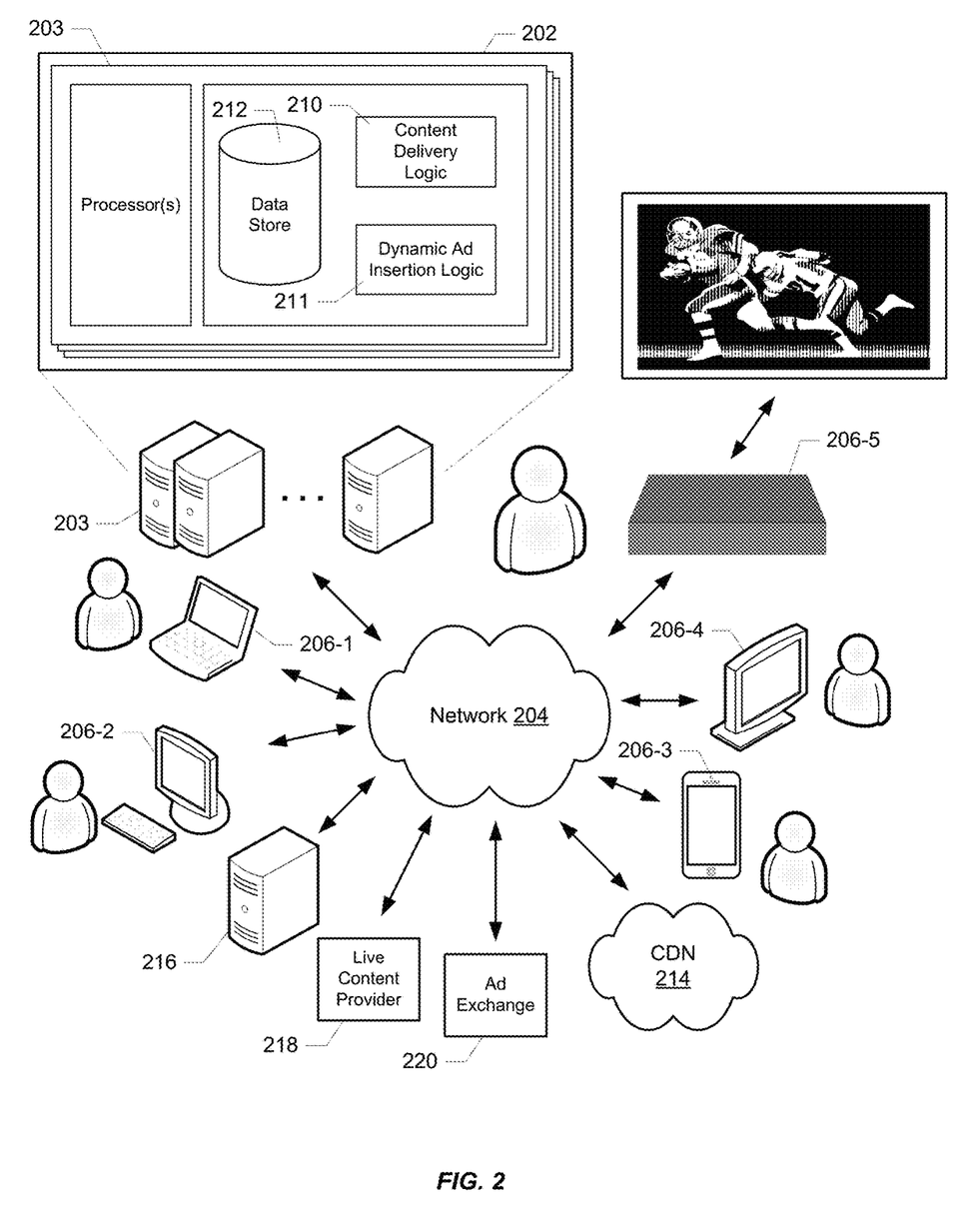
FIG. 2 illustrates an example of a computing environment in which various implementations may be practiced.

FIG. 2 illustrates an example of a computing environment in which a video content service 202 provides live streaming content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both the primary and secondary content to client devices. However, it will be understood that content service 202 may provide access to content in conjunction with one or more content delivery networks (e.g., CDN 214) that may or may not be independent of content service 202. In addition, the source(s) of one or both of the primary and secondary content may or may not be independent of content service 202 (e.g., as represented by content provider server 216, live content provider 218, and ad exchange 220). The range of variations known to those of skill in the art are contemplated to be within the scope of this disclosure.

The various implementations enabled by the present disclosure contemplate logic resident on the client devices consuming video content from content service 202; such logic being configured to handle offsets between segments of live streaming content as described herein. Such logic might be part of an existing algorithm or module on the client device or implemented to work in conjunction with such an algorithm or module.

It should also be noted that implementations are contemplated in which, in addition to content delivery logic 210 (which facilitates various aspects of content delivery to client devices 206), content service 202 may include other types of logic, e.g., logic 211 that facilitates dynamic ad insertion in live content. For example, such logic might be configured to dynamically combine manifest data associated with primary live content (e.g., received from live content provider 218) with manifest data associated with advertising content (e.g., received from ad exchange 220).

In addition to providing access to video content, content service 202 may also include a variety of information related to the video content (e.g., other associated metadata and manifests in data store 212 to which service 202 provides access). Alternatively, such information about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
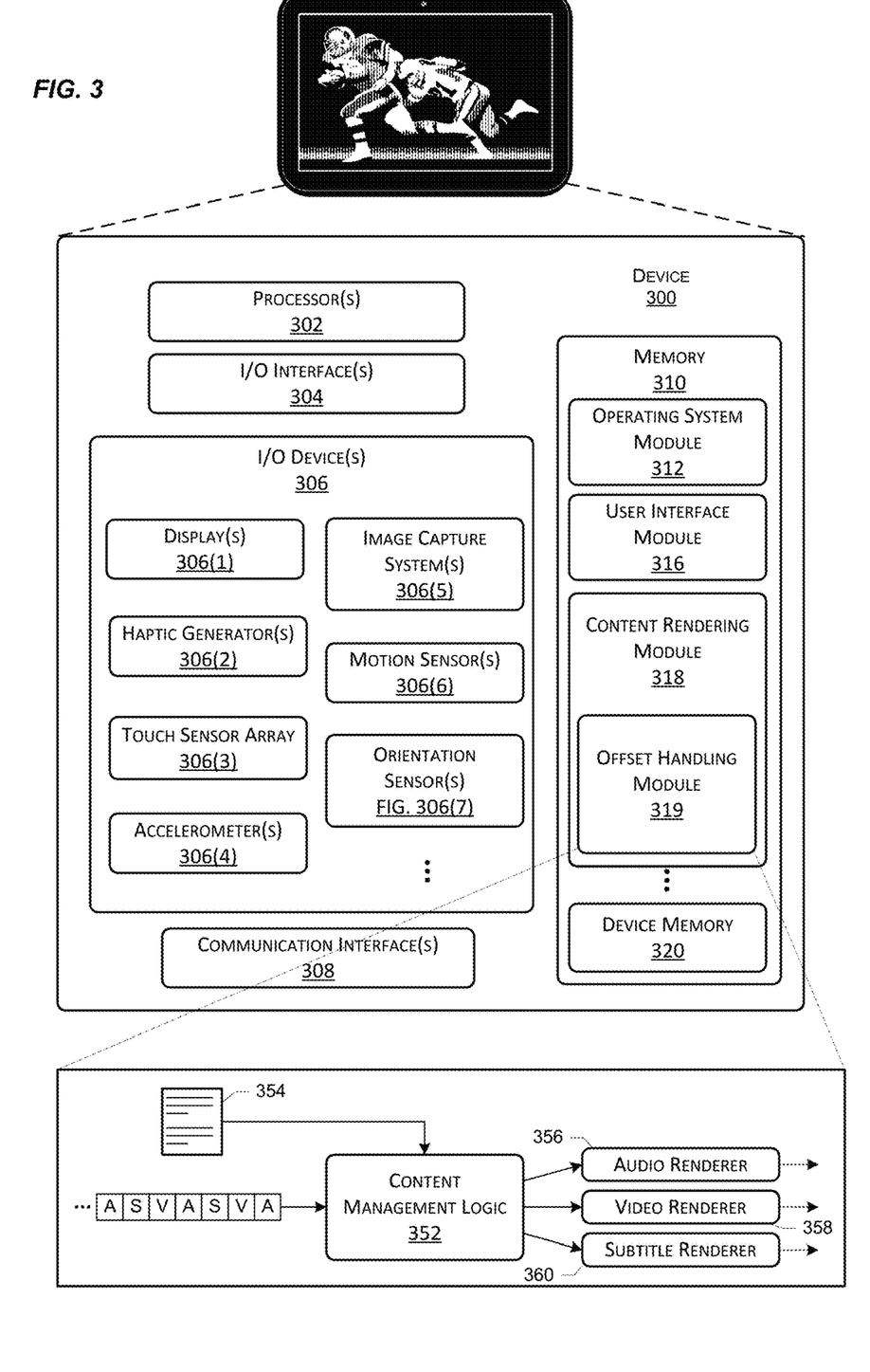
FIG. 3 is an example of a client device in which various implementations may be practiced.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic used to handle offsets between segments of streaming content (represented by 319 in FIG. 3) may be implemented in a variety of ways, e.g., in hardware, software, and/or firmware. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
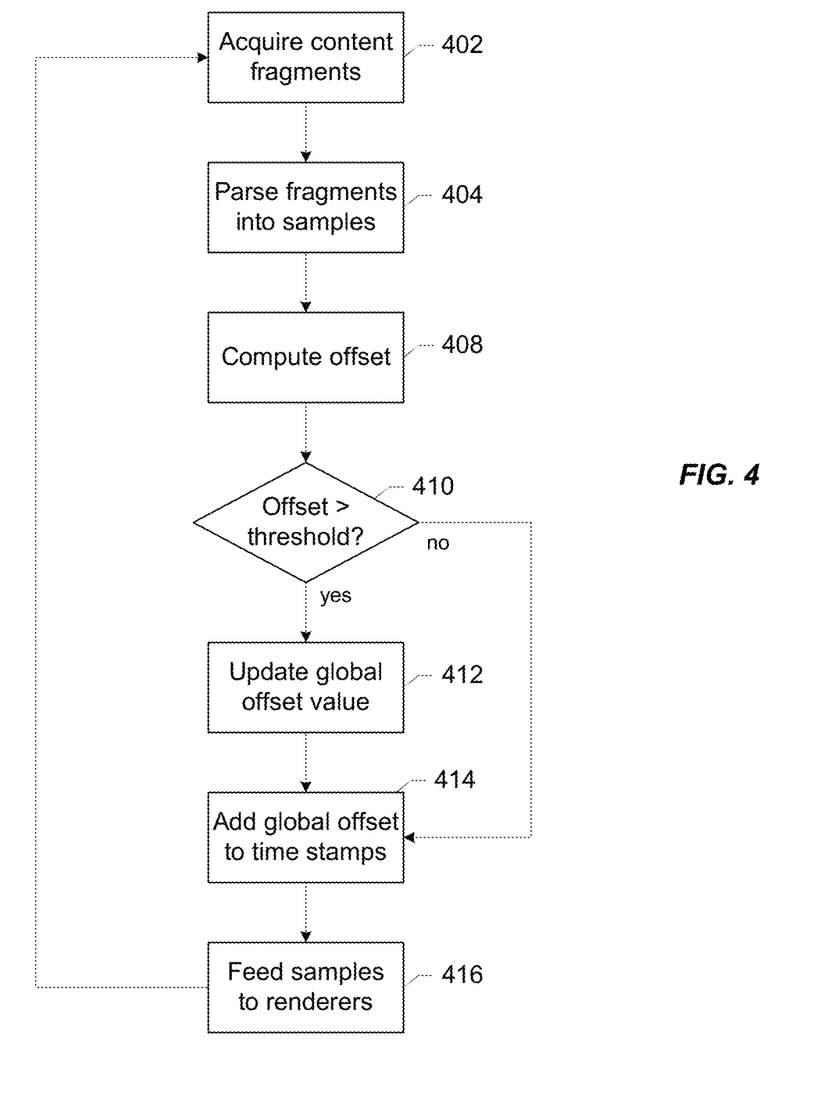
FIG. 4 is a flowchart illustrating operation of a particular class of implementations.

The operation of a particular implementation is described with reference to the flowchart of FIG. 4. The video, audio, and subtitle fragments are requested and downloaded by the media player of the client using the dynamic manifest data (402). Content management logic (e.g., logic 352 of FIG. 3) in the media player parses the downloaded fragments into samples alternately in a single-threaded fashion (404), e.g., in the sequence A1→V1→S1→A2→V2→S2 so on, where each set of fragments (e.g., A1, V1, and S1) are the audio, video, and subtitle fragments for a given content period or segment. The resulting samples (modified as discussed below) are eventually fed to their respective renderers.

When parsing the audio fragments, the content management logic of the media player compares the presentation time or start time of each audio fragment to the end time of the last encountered audio fragment (408), e.g., as derived from the manifest data (e.g., manifest data 354 of FIG. 3). If there is a gap between or an overlap of the two consecutive audio fragments larger than a certain threshold (410), a computed gap or overlap value representing the duration of the gap or overlap is added to or subtracted from a global offset value (412) that represents the cumulative contributions of the gaps and overlaps to that point in the media presentation. An example of a suitable threshold value for evaluating each gap or overlap is about 1 ms. However, a suitable threshold may depend on a specific application. For example, in some contexts, small gaps or overlaps (e.g., on the order of ~100 ns) may be safely ignored, while in others they may not. And note that by parsing the downloaded fragments in the single-threaded order mentioned above, any gap or overlap may be detected before the parsing of the subsequent video fragment is complete.

The content management logic adds the global offset value to the presentation time of each sample of the audio, video, and subtitle components encountered from that point onwards (414). For example, these adjusted presentation times may be included as time stamps in the metadata associated with each sample. Each of the renderers (e.g., renderers 356, 358, and 360 of FIG. 3) are then fed their respective samples with the adjusted presentation times (416). Moreover, the global offset value is updated for each gap or overlap subsequently encountered thus maintaining synchronization.

It should be noted that, while the boundaries between primary content and secondary content are examples of the points at which such offsets or discontinuities can arise, the scope of this disclosure is not so limited. That is, gaps or overlaps can occur between any two segments of content including, for example, between two different segments of secondary content (e.g., for consecutive ads in which the first ad has different durations of audio and video content). Gaps and overlaps can also occur between consecutive segments within the same content. The present disclosure is therefore not limited to cases involving the insertion of secondary content. It should also be noted that, although specific implementations are described herein with reference to the DASH specification, the present disclosure is not so limited. Rather, any streaming technology in which gaps and overlaps between consecutive segments of content can occur may benefit from the techniques described herein.

An overlap is treated as a positive contribution to the global offset value and a gap as a negative contribution. As discussed above, this is because the audio renderer always plays all audio samples being fed to it without regard to the presentation times of the audio samples while the video renderer uses the presentation times of the video samples/frames, comparing them against the audio renderer's playhead to decide when to render, hold or drop the frames. So, application of the global offset to each audio, video, and subtitle sample effectively means that, for each overlap encountered in a media presentation, the presentation times of affected audio, video, and subtitle samples are correspondingly increased; and for each gap, the presentation times of affected samples are correspondingly decreased. Thus, by applying the global offset the synchronization of the audio, video, and subtitle components of a media presentation can be maintained across the boundaries between segments of secondary and primary content.

The DASH standard allows for specification of a "presentationTimeOffset" or "PTO" that may be associated with a segment of content and that indicates that a portion of the first fragment of that content segment should be skipped (i.e., downloaded and decoded but not displayed) by the media player, e.g., because of an overlap with the preceding segment of content. The primary purpose of PTO is to keep the client playhead close to the live playhead. This is generally considered desirable in that the viewer experience can be negatively affected if the content being watched by the viewer lags too far behind the actual live event.

According to some implementations, if PTO is specified and the client's media player is configured to recognize and respond to PTO, a portion of each of the overlapped fragments (both audio and video fragments) are skipped to maintain the desired gap between the client playhead and the live playhead. In such implementations, the audio format should be one in which samples can be independently decoded (e.g., AACL).

More specifically, when parsing audio fragments, if a PTO is encountered it is treated as a flag indicating that a portion of the fragment is overlapping with the last encountered fragment in the stream and must be skipped. The highest sample index within the audio fragment which is at least partially overlapped by the last encountered audio fragment is identified. All audio samples in the fragment preceding that sample are dropped during parsing and the audio renderer is fed starting at the identified audio sample.

Because this example assumes a media player configured to recognize and handle PTO, the overlapped video samples get fed to the video renderer and are decoded but are automatically dropped at the video renderer layer at playback time, effectively skipping the part of the video fragment specified by the PTO. For example, this may be accomplished by low level logic in the video renderer that automatically drops a video frame if the frame's presentation time is more than 30 ms behind the audio playhead. As will be understood by those of skill in the art, the overlapped video frames must be decoded even if they are not played because of the dependencies among the frames in a video fragment that are inherent in most encoding schemes.

Figure 5:
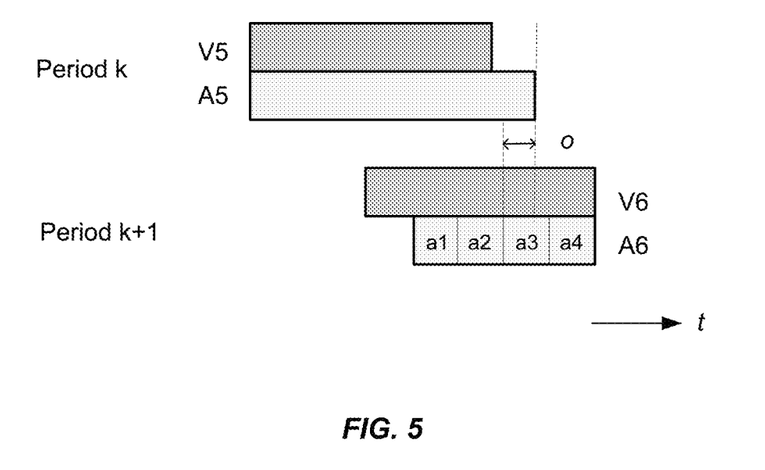
FIG. 5 illustrates another example of an overlap of successive segments of live streaming content.

However, there is no guarantee that the end of the last encountered audio fragment falls exactly at the sample boundary of the audio sample of the next fragment that actually gets fed to the audio renderer. This may be understood with reference to FIG. 5 in which video and audio fragments V5 and A5 of period k overlap with video and audio fragments V6 and A6 of period k+1 in a manner similar to the fragments shown in FIG. 1B. As shown in FIG. 5, audio fragment A6 includes audio samples a1-a4. As discussed above, if PTO is specified, audio samples a1 and a2 (which are fully eclipsed by the overlap) would be dropped and audio sample a3 retained and provided to the audio renderer. However, it is clear that there is still an overlap o between the end of audio fragment A5 and the presentation time of sample a3 of fragment A6.

This is similar to the overlap scenario discussed above with reference to FIG. 1B, albeit on a smaller scale, e.g., on the order of some portion of the duration of a single audio sample rather than a potentially more significant portion of an audio fragment. However, if unaddressed, the cumulative effect of such overlaps might still result in an unacceptable loss of synchronization between the audio and video streams.

Therefore, such an overlap may be handled as described above with reference to the flowchart of FIG. 4. That is, an overlap value is computed based on the end time of the last encountered audio fragment, e.g., A5, and the presentation time of the identified audio sample of the next audio fragment, e.g., sample a3 of fragment A6. This overlap value (if sufficiently large) may then contribute to the global offset value that includes contributions from both gaps and overlaps, and that global offset value applied to affected samples of the audio and video (and subtitle) components of the media presentation.

Thus, at least some techniques enabled by the present disclosure can gracefully handle media timeline discontinuities in live streaming content, maintain audio/video synchronization, and maintain a desired timing between live and client playheads whether or not the media player or the content is configured to take advantage of the presentationTimeOffset feature of DASH.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computing device, comprising:
   memory; and
   one or more processors configured to:
      request audio fragments, video fragments, and subtitle fragments of a media presentation using dynamic manifest data, the media presentation including segments of live event content alternating with segments of advertising content, the live event content and the advertising content originating from different content providers, the dynamic manifest data including presentation time data for each of the audio, video, and subtitle fragments relative to a media timeline associated with the media presentation;
      determine an offset value using the dynamic manifest data, the offset value being based on the presentation time data for a first audio fragment at an end of a first segment of the advertising content and the presentation time data for a second audio fragment at a beginning of a first segment of the live event content;
      adjust time stamps of audio samples, video samples, and subtitle samples associated with the first segment of the live event content using the offset value;
      render and display the audio samples, the video samples, and the subtitle samples associated with the first segment of the live event content based on the adjusted time stamps;
      update the offset value based on the presentation time data for a third audio fragment at an end of a second segment of the advertising content and the presentation time data for a fourth audio fragment at a beginning of a second segment of the live event content;
      adjust time stamps of audio samples, video samples, and subtitle samples associated with the second segment of the live event content using the updated offset value; and
      render and present the audio samples, the video samples, and the subtitle samples associated with the second segment of the live event content based on the adjusted time stamps.

2. The computing device of claim 1, wherein the offset value represents a gap between an end of the first audio fragment and a beginning of the second audio fragment, and wherein the one or more processors are configured to adjust the time stamps of the audio samples, the video samples, and the subtitle samples associated with the first segment of the live event content by subtracting the offset value from each of the time stamps.

3. The computing device of claim 1, wherein the offset value represents an overlap of the first audio fragment and the second audio fragment, and wherein the one or more processors are configured to adjust the time stamps of the audio samples, the video samples, and the subtitle samples associated with the first segment of the live event content by adding the offset value to each of the time stamps.

4. The computing device of claim 3, wherein the one or more processors are further configured to drop one or more audio samples of the second audio fragment based on the overlap, and to inhibit playback of a subset of video samples of a first video fragment at a beginning of the first segment of the live event content based on presentation time offset data received with the video fragments, and wherein the one or more processors are configured to determine the offset value without reference to the dropped audio samples.

5. A computing device, comprising:
   memory; and
   one or more processors configured to:
      request audio and video fragments of a media presentation using manifest data, the manifest data including presentation time data for each of the audio and video fragments relative to a media timeline;
      determine an offset value based on the presentation time data for a first audio fragment at an end of a first segment of content and the presentation time data for a second audio fragment at a beginning of a second segment of content, wherein the offset value represents a gap between or an overlap of the first audio fragment and the second audio fragment;
      adjust time stamps of video samples and audio samples associated with the second segment of content using the offset value; and
      render the video and audio samples associated with the second segment of content based on the adjusted time stamps.

6. The computing device of claim 5, wherein the one or more processors are further configured to:
   update the offset value based on the presentation time data for a third audio fragment at an end of a third segment of content and the presentation time data for a fourth audio fragment at a beginning of a fourth segment of content;
   adjust time stamps associated video samples and audio samples associated with the fourth segment of content using the updated offset value; and
   render the video and audio samples associated with the fourth segment of content based on the adjusted time stamps.

7. The computing device of claim 5, wherein the offset value represents the gap, wherein the gap is between an end of the first audio fragment and a beginning of the second audio fragment, and wherein the one or more processors are configured to adjust the time stamps of the audio samples and the video samples associated with the second segment of content by decreasing each of the time stamps using the offset value.

8. The computing device of claim 5, wherein the offset value represents the overlap of the first audio fragment and the second audio fragment, and wherein the one or more processors are configured to adjust the time stamps of the audio samples and the video samples associated with the second segment of content by increasing each of the time stamps using the offset value.

9. The computing device of claim 8, wherein the one or more processors are further configured to drop one or more audio samples of the second audio fragment based on the overlap, and to inhibit playback of a subset of video samples of a first video fragment at the beginning of the second segment of content based on presentation time offset data received with the video fragments, and wherein the one or more processors are configured to determine the offset value without reference to the dropped audio samples.

10. The computing device of claim 5, wherein the one or more processors are further configured to alternate parsing of the audio fragments and the video fragments into respective samples such that parsing of the first and second audio fragments is complete before parsing of a first video fragment at the beginning of the second segment of content is complete.

11. The computing device of claim 5, wherein the one or more processors are configured to request and receive the audio fragments and the video fragments in accordance with the Dynamic Adaptive Streaming over HTTP (DASH) specification.

12. The computing device of claim 5, wherein the one or more processors are configured to adjust the time stamps of the video samples and the audio samples associated with the second segment of content only where the offset value is greater than 1 millisecond.

13. The computing device of claim 5, wherein the media presentation includes segments of live event content alternating with segments of advertising content, wherein the first segment of content comprises one of the segments of advertising content, wherein the second segment of content comprises one of the segments of live event content, wherein the offset value comprises a gap value or an overlap value between an end of the first audio fragment and a beginning of the second audio fragment, and wherein the one or more processors are configured to adjust the time stamps of the audio samples and the video samples associated with the second segment of content by decreasing each of the time stamps using the gap value or by increasing each of the time stamps using the overlap value.

14. A computer-implemented method, comprising:
  requesting audio and video fragments of a media presentation using manifest data, the manifest data including presentation time data for each of the audio and video fragments relative to a media timeline;
  determining an offset value based on the presentation time data for a first audio fragment at an end of a first segment of content and the presentation time data for a second audio fragment at a beginning of a second segment of content, wherein the offset value represents a gap between or an overlap of the first audio fragment and the second audio fragment;
  adjusting time stamps of video samples and audio samples associated with the second segment of content using the offset value; and
  rendering the video and audio samples associated with the second segment of content based on the adjusted time stamps.

15. The method of claim 14, further comprising:
  updating the offset value based on the presentation time data for a third audio fragment at an end of a third segment of content and the presentation time data for a fourth audio fragment at a beginning of a fourth segment of content;
  adjusting time stamps associated video samples and audio samples associated with the fourth segment of content using the updated offset value; and
  rendering the video and audio samples associated with the fourth segment of content based on the adjusted time stamps.

16. The method of claim 14, wherein the offset value represents the gap, wherein the gap is between an end of the first audio fragment and a beginning of the second audio fragment, and wherein adjusting the time stamps of the audio samples and the video samples associated with the second segment of content includes decreasing each of the time stamps using the offset value.

17. The method of claim 14, wherein the offset value represents the overlap of the first audio fragment and the second audio fragment, and wherein adjusting the time stamps of the audio samples and the video samples associated with the second segment of content includes increasing each of the time stamps using the offset value.

18. The method of claim 17, further comprising dropping one or more audio samples of the second audio fragment based on the overlap, and inhibiting playback of a subset of video samples of a first video fragment at the beginning of the second segment of content based on presentation time offset data received with the video fragments, and wherein the offset value is determined without reference to the dropped audio samples.

19. The method of claim 14, further comprising alternately parsing the audio fragments and the video fragments into respective samples such that parsing of the first and second audio fragments is complete before parsing of a first video fragment at the beginning of the second segment of content is complete.

20. The method of claim 14, wherein requesting and receiving the audio fragments and the video fragments is done in accordance with the Dynamic Adaptive Streaming over HTTP (DASH) specification.

21. The method of claim 14, wherein adjusting the time stamps of the video samples and the audio samples associated with the second segment of content is done only where the offset value is greater than 1 millisecond.

22. The method of claim 14, wherein the media presentation includes segments of live event content alternating with segments of advertising content, wherein the first segment of content comprises one of the segments of advertising content, wherein the second segment of content comprises one of the segments of live event content, wherein the offset value comprises a gap value or an overlap value between an end of the first audio fragment and a beginning of the second audio fragment, and wherein adjusting the time stamps of the audio samples and the video samples associated with the second segment of content includes decreasing each of the time stamps using the gap value or increasing each of the time stamps using the overlap value.

* * * * *